March 11, 1952  S. J. BUDLANE  2,588,350
HEATER CONTROL APPARATUS
Filed Jan. 16, 1948  4 Sheets-Sheet 1

INVENTOR.
Stanley J. Budlane
BY
Fooman L. Nuelly
Atty.

March 11, 1952 S. J. BUDLANE 2,588,350
HEATER CONTROL APPARATUS
Filed Jan. 16, 1948 4 Sheets-Sheet 2

INVENTOR.
Stanley J. Budlane
BY
Toomas L. Mueller
Atty.

March 11, 1952 — S. J. BUDLANE — 2,588,350
HEATER CONTROL APPARATUS
Filed Jan. 16, 1948 — 4 Sheets-Sheet 3
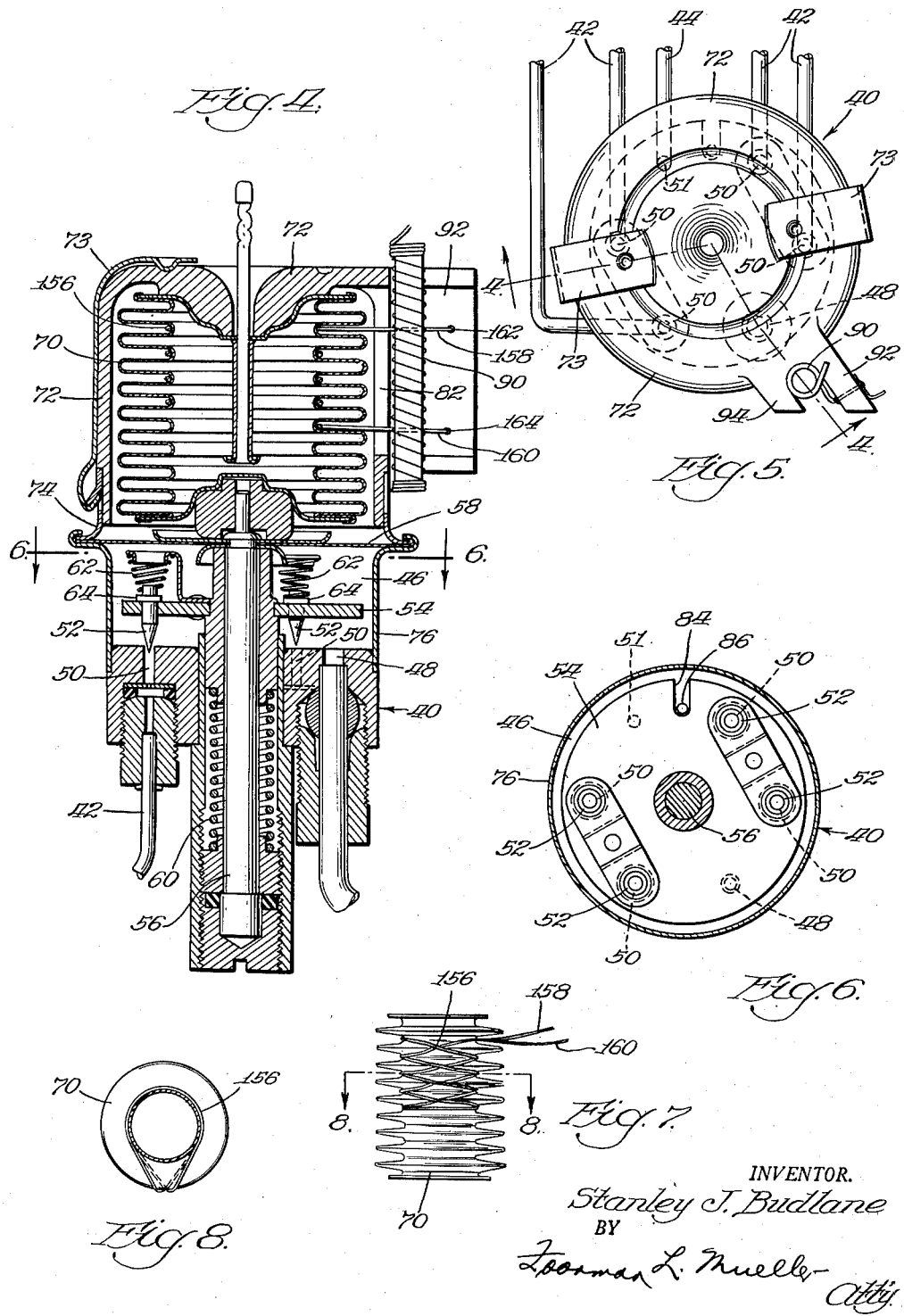
INVENTOR.
Stanley J. Budlane
BY
Foorman L. Mueller
Atty.

March 11, 1952     S. J. BUDLANE     2,588,350
HEATER CONTROL APPARATUS
Filed Jan. 16, 1948                                          4 Sheets-Sheet 4

Fig. 9.

INVENTOR.
Stanley J. Budlane
BY
Foorman L. Mueller
Atty

Patented Mar. 11, 1952

2,588,350

UNITED STATES PATENT OFFICE 2,588,350

HEATER CONTROL APPARATUS

Stanley J. Budlane, Chicago, Ill., assignor to Motorola, Inc., Chicago, Ill., a corporation of Illinois Application January 16, 1948, Serial No. 2,685

14 Claims. (Cl. 236—11)

This invention relates to devices for utilizing fluids such as liquid fuels, and it has particular relation to space heaters of the internal combustion type.

Internal combustion devices which are used for heating the air in enclosed spaces are required to be thoroughly safe in their operation, and it is also desirable that they be subject to some kind of selective control for regulating the temperature within the space that is being heated. In the past these requirements were met in various ways, depending upon the particular uses to which the heaters were put. However, special difficulties have been encountered in providing the features just described in certain kinds of internal combustion heaters, for example, automobile heaters, because of limitations as to the size and cost of the units and the power available for operating them, particularly where the heater functions independently of the vehicle engine. Due to these factors it has not been advantageous to use prior temperature regulators and safety controls in the construction of such heaters.

An object of this invention is to provide an improved heater control apparatus for performing various functions of safety control and temperature regulation in a small, portable low-power heater of the type herein contemplated, said apparatus being exceptionally dependable and yet satisfying the structural limitations that are imposed upon it.

A further object is to provide a novel, automatic heater control apparatus of simple mechanical construction in which the fuel feed is varied according to temperature requirements and the fuel supply is shut off as an incident to failure of combustion, both functions being performed by a single thermal element.

A still further object is to provide an arrangement as just described in which the thermal element directly operates one or more fuel valves by virtue of its force of expansion and contraction in response to temperature variations.

A still further object is to provide an improved vehicle heater having an easily manipulated temperature-selecting control head including a multiposition switch, mounted on the dash or instrument panel of the vehicle.

One of the features of the invention consists in operating a valve by electrically heating an expansible thermal element connected to the valve, provision being made for effecting both safety control and temperature regulation by this principle.

As another feature, I enable the temperature within an enclosed space to be selected in a convenient fashion such as by setting a rotary switch or by depressing a push button, the selected temperature thereafter being maintained automatically by the apparatus.

Another feature of the invention is that the admission of fuel to at least some of the burners in the combustion chamber automatically ceases if the fuel should fail to ignite within a predetermined time interval after the heater is started.

Other features include automatic disconnection of the igniter when combustion occurs, and automatically re-energizing the igniter if combustion should fail while the heater is in operation. Still another feature is that after the heater is switched off, the supply of fresh air to the combustion chamber is continued for scavenging purposes until the heater has cooled.

The term "valve" as employed in the present specification and claims should be understood to mean a member positioned in a relatively confined fluid passage and operable between open and closed positions for varying the effective cross-sectional area of the passage, particularly in instances where the flow of fluid must be controlled to prevent unsafe or undesirable conditions from arising. However, "valve" as used herein does not have reference, for example, to mere dampers for regulating the admission of fresh air to an enclosed space, nor to devices in the nature of relays for closing circuits to valve-operating solenoids and the like.

For a better understanding of the invention, reference is had to the following detailed description thereof taken in connection with the accompanying drawings, wherein:

Fig. 4 is a sectional view of a temperature-responsive bellows and fuel valve selector unit included in my novel control apparatus, this section being taken on the line 4—4 in Fig. 5;

Fig. 5 is a plan view of the device illustrated in Fig. 4;

Fig. 6 is a cross-section on the line 6—6 in Fig. 4;

Fig. 7 is an elevational view of the temperature-responsive bellows and an electric heating element therefor;

Fig. 8 is a cross-section on the line 8—8 in Fig. 7, and

Fig. 9 is a partial circuit diagram of a modified control head which may be utilized in the apparatus.

The control apparatus herein disclosed is designed for use in a small, relatively light-weight, internal combustion heater such as may be used for heating the interior of an automobile or other vehicle. The heater and its control apparatus include various electrical components which are adapted to be operated by a low-voltage power source such as a storage battery. A solenoid-type fuel pump functions continuously while the heater is in operation to supply fuel for the heater. The heater has main burners and a pilot burner. Admission of fuel to the main burners is controlled by fuel valves which are operated selectively by an expansible thermal element in the form of a temperature-responsive bellows unit which is positioned in the intake air stream of the heater. The temperature of the bellows is determined partially by the temperature of the circulating air and partially by the heat which is transferred to the bellows from a pair of independently operated electric heating elements disposed in proximity thereto. The current drawn by one of the heating elements is adjustable through the medium of a multi-position switching means on the instrument panel of the vehicle for selection of the temperature to be maintained within the vehicle, as explained more fully hereinafter.

The other electric heating element is energized by a safety switch that functions in the event combustion of the fuel fails to occur within the heater, whereby the supply of fuel to the main burners is shut off. Additional safety features also are incorporated in the apparatus, as will be described in detail presently. The heater preferably is of the type that operates independently of the vehicle engine, requiring only a relatively low suction which is produced by a motor-driven fan at the outlet of the combustion chamber. Still other features of the construction will become apparent as the description proceeds.

Figure 1:
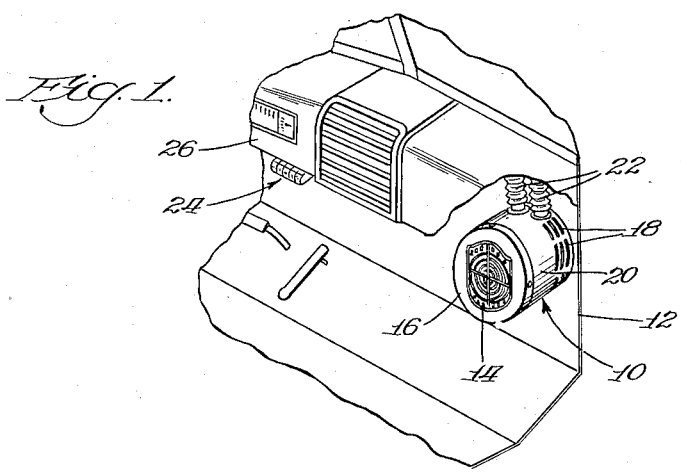
Fig. 1 is a fragmentary perspective view showing how the heater and its control head may be disposed in an automotive vehicle.

Referring now to the drawings, in Fig. 1 the heater 10 is shown mounted on the dash wall 12 of an automobile, being secured thereto in any suitable fashion. Air from the passenger compartment of the vehicle is drawn in through a grille 14 in the cover plate 16 of the heater 10 and is discharged through louvers or other openings 18 in the housing 20 of the heater near the dash wall 12. Provisions are included in the heater 10 for diverting a portion of the heated air through conduits 22 to the windshield defrosters (not shown), when desired. A push-button control head 24 is disposed on the instrument panel 26 of the vehicle for selecting the temperature which is to be maintained in the vehicle by the heater 10.

The particular heater construction which is partially illustrated herein is fully disclosed and claimed in the copending application of Robert Dusek and Stanley J. Budlane, Serial No. 695,478, filed September 7, 1946, being disclosed herein only to the extent necessary for explaining the present invention. Certain aspects of the control apparatus herein disclosed but not claimed are disclosed and claimed in the copending application of Stanley J. Budlane, Serial No. 644,693, filed February 1, 1946.

Figure 3:
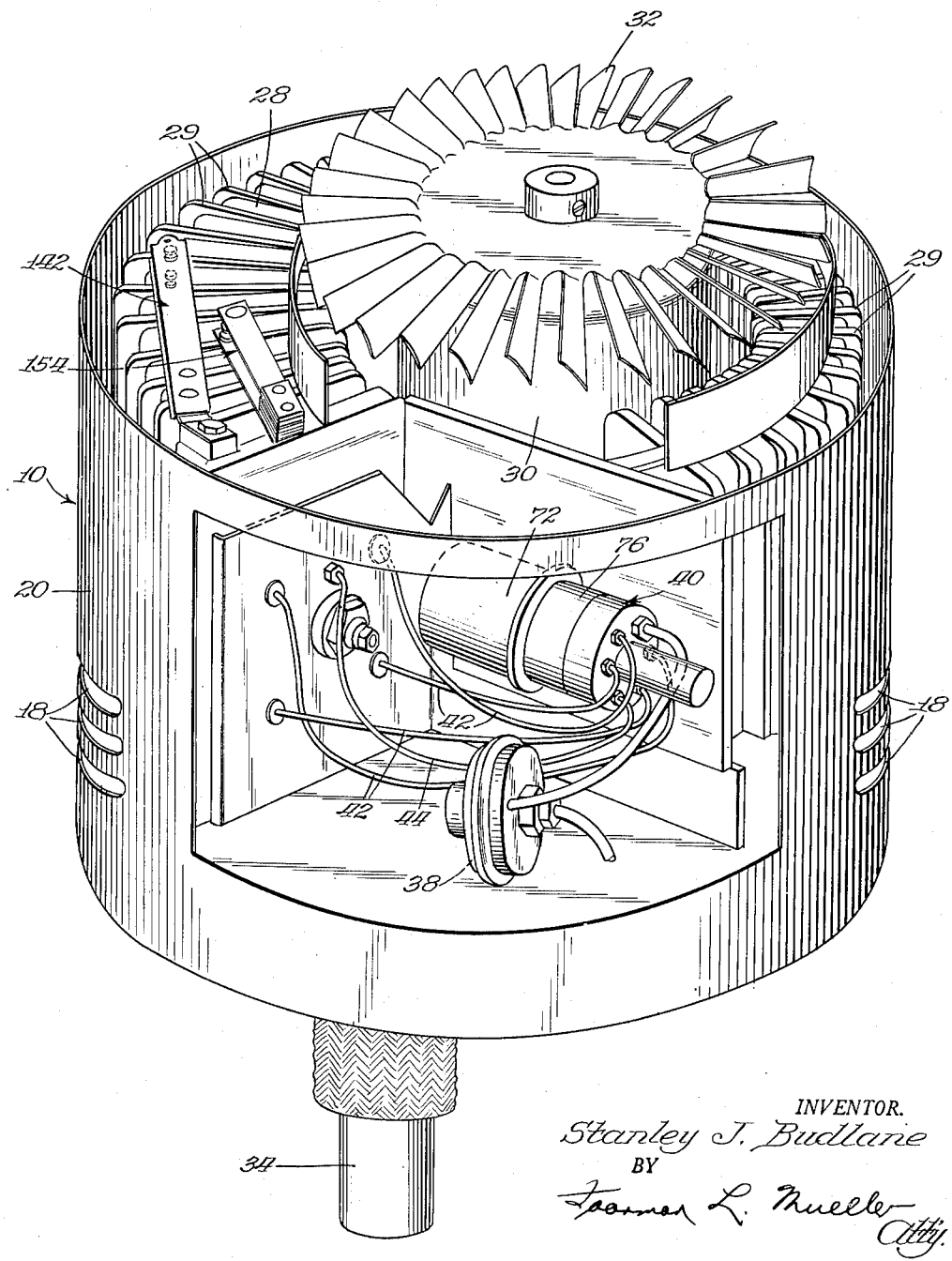
Fig. 3 is a perspective view of the heater partially disassembled to show portions of the control apparatus mounted therein.

In Fig. 3 there is shown the heater with its cover plate and a side panel removed therefrom.

The combustion chamber 28 of the heater is approximately C-shaped and is provided with heat radiating fins 29. A small electric motor 30 is positioned with its axis disposed centrally of the combustion chamber 28, which partially surrounds the motor 30. An air circulating fan 32 is mounted on the end of the motor shaft and functions to direct incoming air from the passenger compartment of the vehicle past the exterior of the combustion chamber 28 in contact with the heat radiating fins 29, and out through the openings 18 in the side of the housing 20. Air is supplied to the interior of the combustion chamber 28 through an air intake duct (not shown) from the motor compartment of the vehicle. An exhaust fan (not shown) positioned at the outlet of the combustion chamber 28 serves to create a slight suction within the chamber 28 and directs the spent products of combustion out through an exhaust duct 34. Thus, the pressure within the combustion chamber 28 is slightly below atmospheric pressure, thereby reducing the danger that products of combustion will leak into the passenger compartment of the vehicle.

Figure 2:
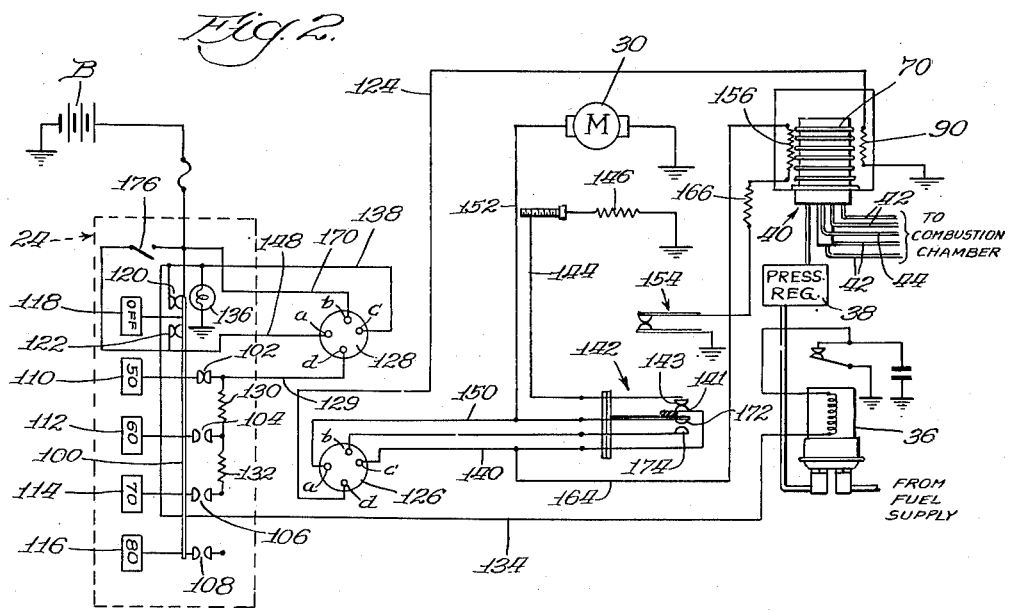
Fig. 2 is a circuit diagram of a heater control apparatus constructed in accordance with and embodying the principles of the invention.

A solenoid-operated fuel pump 36, Fig. 2, which is adapted to be operated by a low-voltage source of energy such as the storage battery B, delivers liquid fuel such as gasoline through a conventional pressure regulator 38 to a fuel valve selector unit generally designated 40, Figs. 2 and 3. From the selector 40, several fuel throttling valve means comprising fuel lines 42 respectively lead to the main burners of the heater 10 within the combustion chamber 28. There is also a fuel line 44 from the selector 40 to the pilot burner of the heater 10. These burners are not disclosed herein but their construction is illustrated and described in the aforesaid copending application of Dusek and Budlane, Serial No. 695,478. Insofar as the present invention is concerned any other suitable burners may be substituted if desired.

One of the functions of the selector unit 40 is to regulate the number of main burners which are in operation, according to temperature requirements within the vehicle. This selector 40 is disposed in the space between the two ends of the C-shaped combustion chamber 28, preferably being mounted on the heater frame in such a manner as to be substantially unaffected by the temperature of the combustion chamber (except under extreme overheat conditions), for a purpose which will appear presently. Referring to Fig. 4, a fuel chamber 46 in the selector 40 communicates with the fuel inlet passage or port 48 and with fuel outlet passages or ports 50 and 51, Figs. 5 and 6, which lead to the various fuel lines 42 and 44, respectively, Figs. 3 and 4. The passages 50 for the main burner fuel lines 42 are provided with needle valves 52 mounted on a movable plate 54 secured to a shaft or plunger 56 which extends longitudinally along the axis of the selector 40. The plunger 56 is attached at one end to a diaphram 58 in the selector 40 and is urged by a spring 60 toward its valve-opening position. The needle valves 52 are slidably mounted in the plate 54 and normally are urged by individual springs 62 toward their lowermost positions (as viewed in Fig. 4) in which their collars 64 bear against the plate 54.

The position of the needle valve plate 54 is controlled by a bellows unit 70 contained within the selector 40, this bellows 70 expanding or contracting in response to changes in the temperature of the air surrounding the bellows. The shanks of the needle valves 52 have different lengths so that the needle valves do not seat simultaneously as the plate 54 approaches the fuel outlet passages 50. As the bellows 70 expands, an increasingly greater number of the needle valves 52 move into their closed positions. On the other hand, as the bellows 70 contracts, the valves 52 open sequentially. The outlet passage 51 for the pilot burner fuel line 44, Figs. 3 and 5, is open at all times in the illustrated heater construction. This is generally accepted as being safe practice because of the extremely low rate at which fuel is delivered to the pilot burner.

The bellows 70 is enclosed by a plastic cover 72, Figs. 4 and 5, which is detachably secured by spring clips 73 to the metallic case 74 included in the housing 76 of the selector unit 40. The cover 72 is apertured to permit a portion of the air that is drawn into the heater 10 by the fan 32 to circulate about the bellows 70. Thus, as shown in Fig. 4, a slot 82 is afforded in the cover 72 intermediate an integral bracket 92 and lug 94 (Fig. 5) formed on the cover 72. Other apertures (not shown) may be provided in the cover 72 to insure free circulation of air about the bellows 70. The bellows is filled with a fluid such as sulphur dioxide having a high temperature coefficient of expansion and contraction, and is arranged to actuate the needle valve plate 54 as hereinbefore described. The plate 54 has a slot or notch 84, Fig. 6, in its edge, and a pin 86 anchored in the body of the selector 40 is received in the slot 84 for the purpose of guiding the plate 54 and preventing rotation thereof about the plunger 56.

The selector unit 40 with its associated bellows 70 tends to maintain the temperature of the air surrounding the bellows constant. If the circulating air temperature decreases, the bellows 70 contracts and opens more of the fuel ports 50. As the air temperature rises, on the other hand, the bellows 70 expands and closes one or more of these fuel ports. There are instances, however, when it is desirable to manually vary the temperature of the air within the vehicle. For example, on a cold day one may not want as high a temperature to be maintained within the vehicle as would be the case on a milder day. To this end, I have provided means for modifying the action of the bellows 70 in response to the circulating air temperature. Such means in the present instance comprises an electric heating element 90, Figs. 4 and 5, which is mounted on the cover 72 between the bracket 92 and lug 94 thereon directly in front of the opening 82 in said cover. This heating element 90 may be selectively energized by the push-button control head 24, Figs. 1 and 2. When the element 90 is energized, it warms the air that comes into contact with the bellows 70 and produces the same effect on the bellows as though the entire body of air within the vehicle had been heated approximately to that temperature by the heater 10. Consequently, certain of the fuel valves that otherwise might remain open are maintained closed, causing fewer burners to operate, and a lower air temperature is maintained within the vehicle than would be the case if the heating element 90 were not energized.

Any standard push-button switch assembly may be utilized in the control head 24, provided that it is capable of controlling the circuits which presently will be described. As illustrated in Fig. 2, the battery B is connected to a common conductor 100 in the control head 24 for applying potential to one terminal of each of the push-button switches 102, 104, 106 and 108 which respectively are adapted to be actuated by the push buttons 110, 112, 114 and 116. Each of these switches normally is in its open position, but is closed when its corresponding push button is depressed. The arrangement is such that only one switch can be closed at any one time, any previously closed switch being automatically released and opened as an incident to closure of said one switch. When a push button is depressed, it is held locked down until another push button is actuated. The push buttons 110, 112, 114 and 116 preferably are marked according to the respective temperatures which may be selected (for instance, 50 degrees, 60 degrees, 70 degrees and 80 degrees, respectively). Another push button 118, designated "off," controls two contacts 120 and 122 which normally are closed except when the push button 118 is depressed. This push button 118 likewise serves to release any previously depressed push button and is itself held locked down until another push button is actuated.

One terminal of the electric heating element 90 is grounded to the metallic case of the selector 40, and the other terminal is connected through a circuit path comprising a conductor 124, contacts designated d of a receptacle 126 and plug 128, and conductor 129 to the push-button switch 102. There are also parallel branches extending from the aforesaid path through a resistor 130 to the push-button switch 104, and through an additional resistor 132 to the push-button switch 106. Switch 108 is electrically inactive, and when its push button 116 is depressed, the bellows 70 is rendered fully responsive to the circulating air temperature without being affected by the heating element 90. The push buttons 110, 112, and 114, together with the push button 116 just mentioned, may be selectively actuated to control the amount of electrical power consumed by the heating element 90. The greater the power consumed, the lower will be the temperature automatically maintained within the vehicle.

When operation of the heater is not desired, the push button 118 is depressed to open the contacts 120 and 122 and also to release any of the remaining push buttons which may have been depressed. When operation of the heater is desired, any one of the push buttons 110, 112, 114 or 116 is depressed according to the temperature which is to be maintained in the vehicle, and the corresponding push-button switch 102, 104, 106 or 108 is closed to supply a selected amount of electrical power (or no power, as the case may be) to the heating element 90. Such actuation of a push button marked with a temperature indication causes the "off" button 118 to be released, whereupon the contacts 120 and 122 automatically close. Closure of contact 120 extends a circuit from battery B through a conductor 134 to the solenoid and contacts of the fuel pump 36, which thereupon starts delivering fuel to the selector 40. A pilot lamp 136 likewise becomes lighted, and circuit also is extended from the contact 120 through a conductor 138 and terminals designated c of the plug 128 and receptacle 126 to a conductor 140 which leads to a contact 141 of a two-circuit bimetallic switch 142, Figs. 2 and 3, mounted in heat-transfer relation on the combustion chamber 28 of the heater. When the combustion chamber is cold, the contact 141 is in engagement with a contact 143 which is connected through a conductor 144 to an igniter element 146 in the pilot burner of the heater. Hence, actuation of a push button 110, 112, 114 or 116 as just described causes the fuel pump 36 to commence operating and simultaneously energizes the igniter 146.

When the contact 122 on the control head 24 is closed upon actuation of a selected push button 110, 112, 114 or 116, potential is extended from the battery B through a conductor 148 and terminals designated $a$ of the plug 128 and receptacle 126 to a conductor 150, which is connected by conductor 152 to the heater motor 30, Figs. 2 and 3. Therefore, the motor 30 commences operating and drives the air circulating fan 32 and the suction exhaust fan (not shown), the latter fan serving to draw fuel and air into the combustion chamber and to expel the products of combustion therefrom.

In the event that combustion should fail to occur within the heater 10, it is highly desirable that the main burner fuel valves be closed so that an excessive quantity of unburned fuel cannot accumulate in the combustion chamber. For this purpose I provide a second thermostatic switch 154, Figs. 2 and 3, mounted on the combustion chamber 28 so as to be influenced by the temperature within the chamber, and this switch 154 is arranged to close a circuit to an auxiliary heating element 156, Figs. 2, 4 and 7, disposed in heat-transfer relation to the bellows 70. Preferably the insulated wire of which the heating element 156 is composed is wound around the convolutions of the bellows 70, as indicated in Figs. 7 and 8, and the wire ends 158 and 160 are brought out and soldered to terminals 162 and 164, Fig. 4, on the bracket 92 (the arrangement of the element 156 on the bellows 70 being illustrated purely diagrammatically in the last-named view). Referring again to the circuit diagram, Fig. 2, one end of the heating element 156 is connected by a conductor 164 to the conductor 140 leading to the contact 141 of the switch 142. The other end of the element 156 is connected through a dropping resistor 166 to a terminal of the thermostatic switch 154, the other terminal of this switch being grounded. The switch 154 includes a bimetallic strip which bends when heated and causes the contacts of the switch 154 to separate. When the combustion chamber of the heater is cold, however, the switch 154 is closed.

Whenever one of the temperature-setting push buttons of the control head 24 is depressed while the combustion chamber is cold, a circuit is completed from the battery B through the contact 120 to the heating element 156, thence through the closed switch 154 to ground. The heating element 156, being in substantially heat-conductive relation to the bellows 70, immediately commences to warm the contents of the bellows and tends to produce closure of all the needle valves 52 controlling the supply of fuel to the main burners of the heater. Such action, however, is not instantaneous. Meanwhile, combustion may take place within the chamber 28, so that the thermal switch 154 eventually becomes heated and opens its contacts. When this occurs, the energizing circuit for the heating element 156 is interrupted and the bellows 70 thereafter is responsive solely to the air temperature as modified by the heating element 90. Should combustion fail to occur in the heater, the combustion chamber remains cold and the switch 154 is maintained closed, whereby the heating element 156 continues to be energized and ultimately heats the bellows 70 to the point where all of the needle valves 52 are closed, whereupon fuel no longer is delivered to any of the main burners.

An instance may arise in which combustion is successfully initiated in the heater but thereafter ceases, notwithstanding that there is a call for heat within the vehicle. If this should occur, the contacts 141 and 143 of the thermostatic switch 142, and also the contacts of the thermostatic switch 154, will close circuits to the igniter 146 and the heating element 156. Because of the fact that the bellows 70 does not act instantaneously in response to the heat from the element 156, the igniter 146 has an opportunity to reinitiate combustion before all of the main burner fuel valves are closed. It has been noted that no fuel valve is provided for the pilot burner; hence, there is nothing to prevent combustion in the pilot burner so long as the igniter 146 is functioning and fuel is being delivered by the pump 36. Consequently, even if the main burner valves are closed and the pilot burner becomes ignited, the heat of the pilot burner eventually will warm the wall of the combustion chamber to the extent necessary for opening the thermostatic switch 154 and de-energizing the element 156, thereby permitting the main burner valves to open due to the subsequent cooling and contraction of the bellows 70.

The operation of the heater may be interrupted when desired by depressing the push button 118 marked "off," Fig. 2. The circuits to the fuel pump 36 and electric heating element 90 adjacent the bellows 70 thereupon are interrupted. Likewise the circuits (if any have been established) for the igniter 146 and heating element 156 are interrupted, and the pilot light 136 goes out. It will be noted, however, that there is a holding circuit for the motor 30 which extends from the battery B through a conductor 170, the terminals designated $b$ of the plug 128 and receptacle 126, and contacts 172 and 174 of the thermostatic switch 142 (assuming that the combustion chamber is hot) to the conductor 152 that leads to the motor 30. This serves to maintain the motor 30 operating until the combustion chamber cools and causes the switch 142 to disengage its contacts 172 and 174. Hence, the exhaust fan functions to scavenge the combustion chamber of substantially all products of combustion and unburned fuel after the heater is switched off. This operation continues until the heater has cooled, and the motor 30 then stops.

The control head 24 is provided with a summer-winter switch 176 which may be closed to shunt the contact 122 and provide a circuit for the motor 30 when the heater is not operating. The air circulating fan then is driven by the motor 30 to produce a circulation of air within the vehicle for cooling purposes.

The heater construction described hereinabove has many advantageous features and is especially well suited for small, portable installations such as automobile heating systems. The direct actuation of the fuel valves 52 by the expansive force of the bellows unit 70 eliminates the need for solenoids and the like. Yet, there is no sacrifice of flexibility in this arrangement, for the valves 52 are capable of being remotely operated by the control head 24 and the combustion failure switch 154 through the medium of electric heating elements 90 and 156 respectively, acting upon the temperature-responsive bellows 70. The structure is compact but simple in design and reliable in operation. The same thermally sensitive element is utilized both for controlling the air temperature within the vehicle and for shutting off the fuel supply in the event of combustion failure, affording a positive control in both instances. The fuel valve selector 40, including the bellows unit 70, has an overall length of only three inches in a commercial model of this invention, and the space occupied by the electric heating elements 90 and 156 and their controlling switches likewise is extremely small. The danger of accumulating any substantial quantity of unburned fuel in the heater is circumvented, and provisions likewise are made for adequate scavenging of the combustion chamber, as herein disclosed. Other advantages not specifically mentioned will occur readily to those skilled in the art.

In Fig. 9 there is illustrated schematically a modified form of control head 180 which may be utilized in place of the control head 24, Fig. 2. The control head 180 includes a rotary switch 182 having an operating shaft 184 to which is connected a pointer or other indicator 186 that cooperates with a dial 188 located on the instrument panel of the vehicle. Various positions on the dial 188 (respectively designated by the reference numerals 190 to 195, inclusive) bear indicia as shown in Fig. 9. An arcuate contact member 196 rotatable with the shaft 184 of the switch 182 is arranged to cooperate with stationary contacts 198, 199 and 200. The rotary contact member 196 has a tail or extension 201 adapted to cooperate with stationary contacts 202, 203 and 204. Connections from the various stationary contacts of the switch 182 to other parts of the apparatus are made through the conductors 129, 134, 138, 148 and 170, which correspond respectively to the like-numbered conductors in Fig. 2.

For all positions of the switch 182, potential is extended from the battery to the conductor 170. As explained above in connection with Fig. 2, this is effective when the heater is switched off to maintain the heater motor 30 in operation for scavenging the combustion chamber. After the chamber cools, operation of the motor ceases (assuming the switch 182 is in its "off" position). When the switch 182 is set to its "fan" position, circuit is extended from the battery through the stationary switch contact 198, rotary switch contact 196 and stationary switch contact 199 to the conductor 148 for causing the motor 30 to operate independently of the heater. This switch position would be utilized in warm weather when it is desired to circulate the air in the vehicle without operating the heater. The fan-operating circuit is established for all switch positions except the "off" position. The pilot lamp 136, which is connected to the stationary contact 199, is lighted whenever the motor 30 is operating.

When the switch is in its lowest temperature-selecting position 192, circuits are extended from the battery through the rotary contact member 196 and the stationary contact 200 to the conductors 134 and 138 for energizing the igniter 146 and the fuel pump 36 (Fig. 2). These two circuits also remain established for all higher switch positions. In this lowest temperature-selective setting of the switch 182, circuit likewise is completed through the contact member 196 (Fig. 9), extension 201 thereof, and the stationary switch contact 202 to the conductor 129, thereby to energize the electric heating element 90 (Fig. 2) directly from the battery. When the switch 182 (Fig. 9) is advanced to the next higher temperature position 193, the tail 201 of the rotary contact member 196 passes from the stationary contact 202 to the stationary contact 203. Circuit from the battery now is completed through a resistor 206 to the electric heating element 90 (Fig. 2), thus reducing the amount of electrical power consumed therein. Similarly, if the switch is advanced to the next higher position 194 (Fig. 9), the contact piece 201 passes from the contact 203 to the contact 204, so that the heating element 90 is energized through the resistors 208 and 206 in series, still further reducing the power consumption therein. When the switch 182 is in its highest position 195, the heating element 90 is entirely disconnected from the battery so that the bellows 70 is directly responsive to the circulating air temperature. Hence, it will be seen that the control head 180 accomplishes the same functions as the control head 24. The utilization of one or the other type of control head is a matter of choice, and any other equivalent means may be employed, if desired.

While several preferred embodiments have been disclosed, these obviously are capable of modification within the purview of the invention, and it is intended that all such modifications be included in the scope of the appended claims.

I claim:

1. In a space heater which includes a combustion chamber and fuel throttling valve means for admitting a combustible fluid to said chamber, the combination comprising an expansible thermal element arranged to actuate said throttling valve means by its force of expansion and contraction, first and second electric heating elements, said thermal element being responsive to the temperature within the space that is being heated and also being affected by the heat from said heating elements, manual switch means adjustable according to a selected space temperature and adapted to effect energization of said first heating element, and thermostatic switch means responsive to the temperature of said combustion chamber for energizing said second heating element when the temperature of the combustion chamber falls below a predetermined value.

2. The combination set forth in claim 1, wherein said thermal element comprises a bellows filled with a fluid having a high temperature coefficient of expansion and contraction.

3. The combination set forth in claim 1, further characterized by a plurality of dropping resistances and wherein said manual switch means comprises a device for selectively inserting said resistances in circuit with said first heating element for controlling the energy applied thereto.

4. In a space heater which includes a combustion chamber and fuel throttling valve means for admitting a combustible fluid to said chamber, the combination comprising an expansible thermal element arranged to actuate said throttling valve means toward closed position by its force of expansion, said thermal element being at least partially exposed to the air in the space that is being heated, a pair of electric heating elements disposed in heat transfer relation to said thermal element, manually controlled energizing means for one of said heating elements, and thermostatic means responsive to the temperature of the combustion chamber for energizing the other of said heating elements when combustion fails to occur.

5. In an apparatus adapted to utilize a fluid and having a throttling valve to regulate the flow of such fluid depending upon the existence of a predetermined condition at the point of utilization, the combination comprising a condition-responsive switch means at the fluid utilization point, an expansible thermal element arranged to actuate said throttling valve by its force of expansion and contraction, and an electric heating element in circuit with said switch means and so disposed as to affect the temperature of said thermal element, said condition-responsive switch means operating to close said circuit and thereby energize said element in response to failure of said apparatus to utilize the fluid, whereby said throttling valve is operated by said switch means through the medium of said heating element and said thermal element to stop the flow of fluid.

6. In an apparatus adapted to utilize a fluid and having a throttling valve to control the supply of fluid thereto, the combination comprising a condition-responsive means at the point where the fluid is utilized in the apparatus, said means including a switch automatically closable when a condition occurs such that the fluid is unused for longer than a given time, an expansible thermal element arranged to actuate said throttling valve by its force of expansion and contraction, and an electric heating element in circuit with said switch and so disposed as to affect the temperature of said thermal element, said switch when closed energizing said heating element to heat said thermal element so that said throttling valve is operated by said condition-responsive means through the medium of said heating element and said thermal element to shut off the supply of fuel.

7. In a space heater having a burner and throttling valve means controlling the admission of a combustible fluid to said burner, a thermally sensitive element responsive to variations of temperature in the space that is being heated and adapted to control said throttling valve means for reducing such variations, a thermostatic device disposed so as to be affected by the temperature of said burner, and having control portions which operate when the temperature of said burner falls below a predetermined value, and a heating element controlled by said control portions of said thermostatic device and arranged in heat transfer relation to said thermally sensitive element, said heating element heating said thermally sensitive element and causing operation thereof so that said throttling valve means is actuated toward its closed position as an incident to failure of combustion in said burner.

8. In a space heater having a combustion chamber and throttling valve means for admitting a combustible fluid to said chamber, an expansible thermal element arranged so as to be affected by variations of temperature in the space that is being heated, said thermal element being adapted to actuate said throttling valve means toward closed position by its force of expansion, a heating element disposed in heat transfer relation to said thermal element, and a thermostatic device responsive to ignition failure in said combustion chamber for effecting operation of said heating means.

9. In a space heater having a combustion chamber and throttling valve means for admitting fuel at a variable rate to said combustion chamber, a bellows unit responsive to variations of temperature in the space that is being heated and adapted to actuate said throttling valve means by its force of thermal expansion and contraction for maintaining a given space temperature, an electric heating element disposed in heat transfer relation to said bellows unit, and a thermostatic switch arranged to energize said heating element in response to failure of combustion, whereby said throttling valve means automatically operates to reduce the rate of fuel feed under such circumstances.

10. In an internal combustion heater having a pilot burner, ignition means for the pilot burner, and at least one main burner, the combination comprising a throttling valve means for controlling the admission of fuel to said main burner, means independent of said throttling valve means for supplying fuel to said pilot burner, an expansible thermal element, motion-transmitting means between said thermal element and said throttling valve means, said thermal element being effective when heated to actuate said valve means toward its closed position, a first thermostatic contact means responsive to the temperature of the heater and adapted to deactivate said ignition means upon said heater reaching a predetermined temperature, an electric heating element disposed in proximity to said thermal element, and a second thermostatic contact means responsive to the temperature of the heater for energizing said heating element as an incident to failure of combustion, whereby only the pilot burner fuel supply continues if combustion fails to occur within a given time interval.

11. In an internal combustion air heater having a plurality of burners and ignition means for the burners, a selector throttling valve comprising a plurality of fuel valves one for each of the burners, a selector throttling valve-operating member effective to vary the number of burners in operation, according to the extent to which it is actuated, an expansible thermal element responsive to the temperature of air that is being heated, motion-transmitting means between said thermal element and said selector valve-operating member, thermostatic switch means responsive to the effective temperature of the heater, and an electric heating element controlled by said switch means and arranged in heat transfer relation to said thermal element for closing all said fuel valves if combustion fails to occur.

12. In an internal combustion heater for automotive vehicles, throttling valve means for admitting combustible fluid to the heater at a variable rate, an expansible thermal element responsive to fluctuations of the air temperature within the vehicle and arranged to actuate said throttling valve means for reducing such fluctuations, a first electric heating element so disposed as to augment the heat transferred to said thermal element from the air, a control unit including variable resistance means selectively operable to vary the power consumed by said first heating element, thereby to determine the temperature maintained in the vehicle by said thermal element, a combustion failure switch, and a second electric heating element controlled by said switch and disposed in heat transfer relation to said thermal element for effecting closure of said throttling valve means as an incident to failure of combustion in the heater.

13. In an internal combustion space heater including electrically operated fuel feeding means and electrically operated combustion air supply means, a control circuit including in combination, main switch means for effecting concurrent operation of said fuel feeding means and said combustion air supply means, fuel control means responsive to the temperature of the heater and including a throttling valve for controlling the heat output of said heater and an expansible thermal element coupled to said throttling valve for moving the same between various fuel supplying positions, said thermal element being at least partly exposed to the air in the space being heated, first and second heating elements positioned adjacent said expansible thermal element for transferring heat thereto, thermostatic means responsive to the temperature of the heater for energizing said first heating element to cause operation of said thermal element for cutting off the feed of fuel as an incident to failure of combustion in the heater, control switch means for controlling the energization of said second heating element, and a thermostatic switch responsive to the temperature of the heater for energizing said combustion air supply means independently of said main switch and said fuel supply means when the temperature of the heater is above a predetermined value.

14. In an internal combustion space heater including electrically operated fuel feeding means and an electrical igniter, a control circuit including in combination, main switch means for effecting concurrent operation of said fuel feeding means and igniter, a thermostatic switch responsive to the temperature of the heater for de-energizing said igniter when the temperature of said heater reaches a predetermined value, fuel control means responsive to the temperature of the heater and including a throttling valve for controlling the heat output of said heater and an expansible thermal element coupled to said throttling valve for moving the same between various fuel supplying positions, said thermal element being at least partly exposed to the air in the space being heated, a heating element positioned adjacent said expansible thermal element for transferring heat thereto, and thermostatic means responsive to the temperature of the heater for energizing said heating element to cause operation of said thermal element for cutting off the feed of fuel as an incident to failure of combustion in the heater for a predetermined time interval.

STANLEY J. BUDLANE.

REFERENCES CITED

The following references are of record in the file of this patent:

UNITED STATES PATENTS

| Number | Name | Date |
| --- | --- | --- |
| 1,883,242 | Bogle | Oct. 18, 1932 |
| 2,047,878 | Mackintosh | July 14, 1936 |
| 2,052,536 | Shivers | Aug. 25, 1936 |
| 2,164,353 | Sargent | July 4, 1939 |
| 2,183,973 | Raney | Dec. 19, 1939 |
| 2,234,288 | Smith et al. | Mar. 11, 1941 |
| 2,237,248 | Denison | Apr. 1, 1941 |
| 2,280,353 | Ray | Apr. 21, 1942 |
| 2,282,197 | Maynard | May 5, 1942 |
| 2,323,767 | Hammond | July 6, 1943 |
| 2,348,969 | Gauger | May 16, 1944 |
| 2,416,766 | Miller et al. | Mar. 4, 1947 |
| 2,482,565 | Tramontini | Sept. 20, 1949 |